United States Patent [19]

Fenn

[11] Patent Number: 4,477,995

[45] Date of Patent: Oct. 23, 1984

[54] LINE-MEASURING FISHING BOBBER

[75] Inventor: Larry L. Fenn, Lancaster, Ohio

[73] Assignee: Fenn-Niemann, Inc., Lancaster, Ohio

[21] Appl. No.: 519,060

[22] Filed: Aug. 1, 1983

[51] Int. Cl.³ .............................................. A01K 93/00
[52] U.S. Cl. .................................................... 43/43.11
[58] Field of Search ..................... 43/43.11, 43.1, 44.91

[56] References Cited

U.S. PATENT DOCUMENTS

| | | | |
|---|---|---|---|
| 2,177,697 | 10/1939 | Fairbanks | 43/43.11 |
| 2,734,304 | 2/1956 | Yulich | 43/43.11 |
| 2,984,040 | 5/1961 | Fogaley | 43/43.11 |
| 3,464,141 | 9/1969 | Amlin | 43/43.11 |
| 3,755,953 | 9/1973 | Mliner | 43/43.11 |

Primary Examiner—Gene P. Crosby
Attorney, Agent, or Firm—Frank H. Foster

[57] ABSTRACT

An indicia-bearing guage is mounted in a watertight housing and is driven in reduced proportion to an external pulley by a gear and pinion assembly within the housing. A manually positionable index is disposed on the housing to engage a detent projecting from the gauge and to move along with it without hindering the gauge rotation. A manually positionable stop is also disposed on the housing to engage the detent, but the stop serves as an impediment to the movement of the gauge. A slip connection is provided between the gear and pinion assembly and the gauge so that the pulley can continue to rotate if a substantial force is applied to the line while the detent is being hindered by the stop.

6 Claims, 5 Drawing Figures

LINE-MEASURING FISHING BOBBER

BACKGROUND OF THE INVENTION

The present invention relates to fishing line floats or bobbers, and more particularly to spool-type bobbers capable of extending the weighted end of the line a measurable distance into the water after casting, and retrieving this portion of the line as the bobber is hauled up to the rod by the fishing reel.

A major advantage of a reel-type or spool-type bobber over a conventional, fixed position bobber is the capacity to draw the hooked end of the line up to itself as the spool-type bobber is being reeled in to the rod. In this manner, the spool-type bobber and the hook may be cast as a unit into the water, thereby permitting more accurate and extended casts than those obtained with fixed position bobbers. Once cast, the spool-type bobber permits the baited end of the line to descend into the water a preselected distance.

One drawback to prior art fishing bobbers that extend and retract the line remotely from the operator was their inability to measure the depth of the water in which they were cast. While it was, in some cases, possible to obtain a depth measurement by reverse calculation when the bobber was close to the angler, none of the prior art floats known to the inventor was equipped with a gauge that, upon retrieval, provided a depth reading of the area into which it had previously been cast. Once the fishing person began to reel in the line, the bobber gauge reacted by moving away from the actual sounding. In order to obtain a true measurement of the distance between the surface of the water and the bottom, the operator had to be able to read the bobber's gauge without retracting the fishing line. Thus, he or she had to be present, at least for a short time, in the area intended to be fished. If unable to wade or boat to this location, an accurate sounding was not possible; yet, to approach a promising spot too closely would tend to scare away the fish.

The present line-measuring fishing bobber is, upon retrieval, able to provide depth readings for waters into which it was previously cast. Unlike the prior art, it is provided with a movable indicia-bearing gauge that is driven by the movement of the line and with an index or pointer that may be positioned to move in tandem with the gauge as the weighted end of the line descends into the water. As the line is retracted, however, the index remains stationary. The closest prior art known to the inventor are U.S. Pat. Nos. 2,177,697; 2,984,040; and 3,755,953. All three patents disclose line-controlling bobbers provided with indicators that are driven by both the extension and retraction of the line and with stationary indicia-bearing portions.

Other drawbacks to prior art line-controlling bobbers were their inability to play out additional line once the desired depth had been reached and their lack of watertight housings for their drive mechanisms. These drawbacks have been overcome in the present invention by placing a clutch or slippage device between the gauge and the drive mechanism, and by providing a line-engaging pulley external to the drive mechanism housing as well as watertight fittings between the housing and the moving parts extending into the housing.

SUMMARY AND OBJECTS OF THE INVENTION

A line-measuring fishing bobber according to the present invention comprises basically a housing; a rotative shaft extending into the housing; a line-engaging pulley secured to the shaft external to the housing; an indicia-bearing gauge mounted within the housing and provided with a detent; means disposed within the housing for driving the gauge in reduced proportion to the movement of the pulley; and a manually positionable index mounted on the housing and engagable with the detent for substantially nonimpeding movement therewith as the gauge is driven in one direction and disengagable from said detent as said gauge is driven in the opposite direction.

Preferably the present invention also includes a manually positionable stop mounted on the housing and engagable with the detent to resist movement of the gauge, and a slip connection disposed within the means for driving the gauge that permits rotation of the pulley while the gauge is impeded by the stop.

A primary object of the present invention is to provide a fishing bobber capable of measuring the depth of a body of water upon casting and of retaining that measurement when retrieved. Another object of the present invention is to provide a fishing bobber capable of deploying and retracting a preselected amount of line upon casting. Another object is a bobber having a slip mechanism that permits additional line to be deployed after reaching a preselected amount. Yet another object of the present invention is to provide a fishing bobber having a gauge and a drive mechanism disposed within a watertight housing. A further object of the present invention is to provide a compact fishing bobber that may be mounted on the fishing line without removing the rigging at the free end thereof. Further objects and advantages of the present invention may be more readily perceived and understood in view of the following drawings and description.

DETAILED DESCRIPTION OF THE PREFERRED EMBODIMENT

Figure 1:
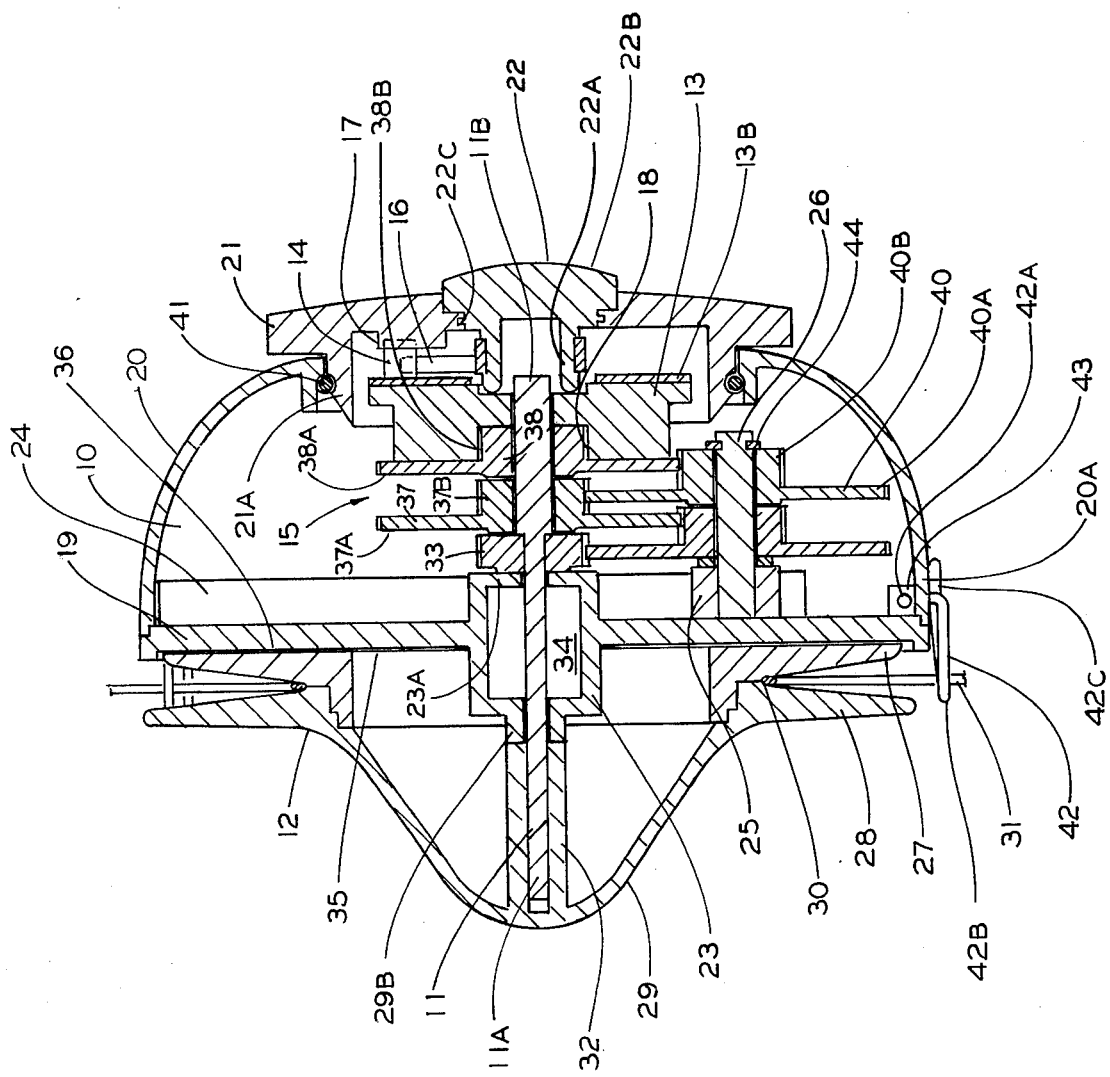
FIG. 1 is an enlarged vertical sectional view taken along line 1—1 of FIG. 2 illustrating particularly the preferred construction of a line-measuring bobber according to the present invention.

As best indicated in FIG. 1, the present invention comprises basically a housing 10; a rotative shaft 11 extending into the housing, a line engaging pulley 12 secured to the shaft 11 externally to the housing 10; an indicia-bearing gauge 13 disposed within the housing and provided with a detent 14; means 15 disposed within the housing in communication with the shaft and the gauge for driving said gauge in reduced proportion to the movement of the pulley 12; and a manually positionable index 16 mounted on the housing and engagable with the detent 14 projecting from the gauge 13 for relatively nonimpeding movement therewith as the gauge is driven in one direction and disengagable as said gauge is driven in the opposite direction. In addition, the preferred embodiment of the present line-measuring fishing bobber is equipped with a manually positionable stop 17 that is mounted on a stop dial 21 and that is engagable with the detent 14 to resist movement of the gauge 13. Also, the means 15 for driving the gauge 13 includes, preferably, a slip connection 18 that permits rotation of the shaft while the stop 17 engages the detent 14.

The housing 10 is a hollow, hemispherical structure composed, preferably, of synthetic resin material and provided with a generally disc-shaped base 19, a dome 20, the stop dial 21 and an index dial 22. The disc-shaped base 19 of the housing is formed with a central cylindrical bearing 23 in which the shaft 11 is disposed for rotative movement and with four reinforcing ribs 24 extending radially outwardly from the bearing 23 to positions slightly inward of the dome 20. The base 19 is also provided with a cylindrical boss 25 that is axially offset from the bearing 23. A cylindrical post 26 that is substantially shorter than the shaft 11 is formed as a unitary extension of the offset boss 25 and extends toward the dome 20 in parallel, axially offset relation to the shaft 11.

The pulley 12 is formed, preferably, from synthetic resin material and is provided with an inner rim 27 and with an outer rim 28 from which a hub 29 protrudes. The inner and outer rims 27 and 28 are glued or otherwise rigidly secured together so that their relatively inclined, opposing faces form a narrow, circular seat 30 against which a fishing line 31 may be disposed. Before rims 27 and 28 are glued together, rim 27 is preferably sprayed with an adhesive, that gives a nonslip surface for the line to ride on. In addition, a shaft-receiving cylindrical boss 32 extends inwardly from the center of the hub 29.

The shaft 11 may be composed of a corrosion-resistant metal such as stainless steel and is formed, preferably, with one relatively smaller diameter portion 11A and with a relatively larger diameter portion 11B. A drive pinion 33, preferably formed from a synthetic resin material such as nylon, is force-fitted, glued or otherwise rigidly secured to the smaller diameter portion 11A of the shaft in abutment with a shoulder 34 formed between the larger and smaller portions 11A and 11B of the shaft.

The pulley 12 and housing base 19 are connected in the following manner. The small end of the shaft is extended through the bearing 23 and is force-fitted, glued or otherwise rigidly secured within the bore of the pulley boss 32. Said smaller shaft portion 11A, pulley boss 32 and bearing 23 are dimensioned so that the face of the drive pinion 33 that is not abutting the shoulder 34 is pressing against the inner end plate 23A of the shaft bearing 23. In addition, the open end of the pulley boss 32 and the outer end 23B of the bearing contact one another. In this manner, the fishing line 31 rotates the pulley 12, causing the pulley to rotate the shaft 11 and the drive pinion 33. The shaft bearing 23 remains substantially stationary, and the open end of the pulley boss 32 rotates against the outer end 23B of the bearing, while the drive pinion 33 rotates against the inner end plate 23A of said bearing. Lubricating or packing material 34, such as graphite or silicone, may occupy the space between the cylindrical side wall of the bearing and the shaft. Thus, the frictional contact between the pulley boss 32 and the outer end of the bearing 23B, between the bearing and the shaft, and between the drive pinion 33 and the inner bearing plate 23A serve as barriers to the entrance of water and particulate matter into the housing 10. In addition, the lubricating and packing material 34 absorbs and filters any seepage into the bearing. Finally, the inner rim 27 of the pulley 12 is provided with a planar face 35 that is disposed in close proximity to a planar outer surface 36 on the housing base 19, thereby preventing solid matter such as weeds and debris from fouling the pulley boss, the shaft or the shaft bearing.

Once the shaft, pulley and drive pinion 33 are secured to one another for common rotative movement relative to the shaft bearing 23, the means 15 for driving the gauge 13 may be assembled. Preferably, the means for driving the gauge comprise a pair of nylon gear and pinion assemblies 37 and 38 rotatively mounted on the shaft 11 and a pair of substantially identical nylon gear and pinion assemblies 39 and 40 rotatively mounted on the post 26 in meshing relation with the assemblies 37 and 38. Each of the gear and pinion assemblies 37–40 is formed with a relatively larger diameter gear 37A–40A and with a relatively smaller diameter pinion 37B–40B axially aligned with and rigidly secured to one another. The assemblies are sized and positioned so that the drive pinion 33 rotates the inner gear 39A on the post; the inner pinion 39B on the post rotates the inner gear 37A on the shaft; the inner pinion 37B on the shaft rotates the outer gear 40A on the post; and the outer pinion 40B on the post rotates the outer gear 38A on the shaft. Due to the difference in diameter between the gear and the pinion of each assembly and their relative positioning, the pulley, shaft and drive pinion rotate in unison approximately 100 times during a single rotation of the outer gear 38A on the shaft.

The slip connection 18 provided in the means 15 for driving the gauge 13 exists between the outer pinion 38B mounted on the shaft and a cylindrical tubular base portion 13A formed on the gauge. The base portion 13A of the gauge is provided with a generally smooth surfaced wall surrounding a central bore that opens onto and receives the outer pinion 38B on the shaft. The central bore and outer pinion are equal in diameter, so that the teeth of the pinion contact the wall of the gauge base surrounding the central bore.

As the outer gear 38A and pinion 38B on the shaft are rigidly interconnected, they rotate in unison. Likewise, the gauge 13 rotates ordinarily in unison with the pinion 38B, which it contacts via the slip connection 18. When, however, rotation of the gauge is resisted by the stop 17 in the manner described below, the slip connection permits the outer pinion and hence, the drive pinion, shaft and pulley, to continue to rotate if sufficient force is applied to the pulley.

An indicia-bearing, circular face plate 13B is mounted on the base 13A of the gauge. Radially projecting lines are placed on the face plate so that they are separated from one another at approximately their midpoints by a distance equal to the amount of rotation that the gauge undergoes when the pulley is rotated by one foot of fishing line. A zero line is chosen arbitrarily and is marked as such, and every fifth mark, moving in clockwise fashion, is numbered accordingly. The detent 14 projects from approximately the midpoint to the outer end of the designated zero line towards the stop dial 21.

The stop 17 projects inwardly from a position on the stop dial 21 that permits it to engage the detent 14. The stop dial 21 is mounted in an opening formed in the dome 20 for manual rotation. An O-ring 41 is seated between the inwardly projecting, cylindrical wall of the dome surrounding the opening and the outer cylindrical surface of the inwardly projecting base 21A of the stop dial. In this manner, water and particulate matter are prevented from entering the housing 10 between the dome 20 and the stop 21, and the stop dial is prevented from rotating unless the angler moves said dial by hand. The stop dial is formed from a transparent material, preferably a colorless acrylic resin, and the stop is tinted so that the operator can see the stop and the indicia-bearing face of the gauge 13 through the stop dial.

The index 16 projects radially outwardly from a cylindrical base portion 22A of the index dial 22. The base portion is axially aligned with the large end 11B of the shaft, and the index 16 is positioned to engage the detent 14 without touching the stop 17. In addition, the index is mounted on the dial base 22A for relatively free rotative movement so that the index will not hinder the detent upon engagement therewith. The index dial 22 is seated in a central opening in the stop dial and is manually rotatable in said seated position by means of a protruding knob portion 22B which is grasped and rotated by the fingers of the user. An outwardly projecting, circular ridge 22C is formed on the base portion 22A and is snap-fitted into the cooperative, annular groove formed in the stop dial 21 adjacent to the central opening therein. In this manner, the index dial remains firmly seated in the stop dial so that water cannot invade the housing 10. Preferably, the index is colored differently from the stop, so that the two are readily distinguishable, and the index dial is formed from a colorless acrylic resin.

Anchored to the rim 20A of the housing dome 20 are a pair of line guides or hangers 42 that are spaced, preferably, 120 degrees apart on said rim (FIGS. 2-5). Each of the guides 42 is formed from resilient wire that is deformed into a generally S-shaped configuration. One end 42A of the guide is force-fitted, glued or otherwise rigidly secured within a bore formed in an anchoring block 43 that is attached to the inner surface of the dome 20. The guide projects from its anchored end 42A into a line-receiving loop 42B that is aligned with the opening between the opposing rims 27 and 28 of the pulley 12. The free end of the wire is curled against itself to form a rounded end 42C that presses resiliently against the rim 20A of the dome.

Once the drive gear 33, shaft 11, housing base 19 and pulley 12 have been assembled, the means 15 for driving the gauge are positioned on the post 26 and on the large portion 11B of the shaft. The line guides 42, stop dial 21 and index dial 22 are then attached to the dome 20, and this assembly is fitted onto the housing base 19. Cooperative ledges are formed, preferably, along the perimeter, mating surfaces of the base 19 and dome rim 20A, and a waterproof adhesive is applied therebetween.

Figure 2:
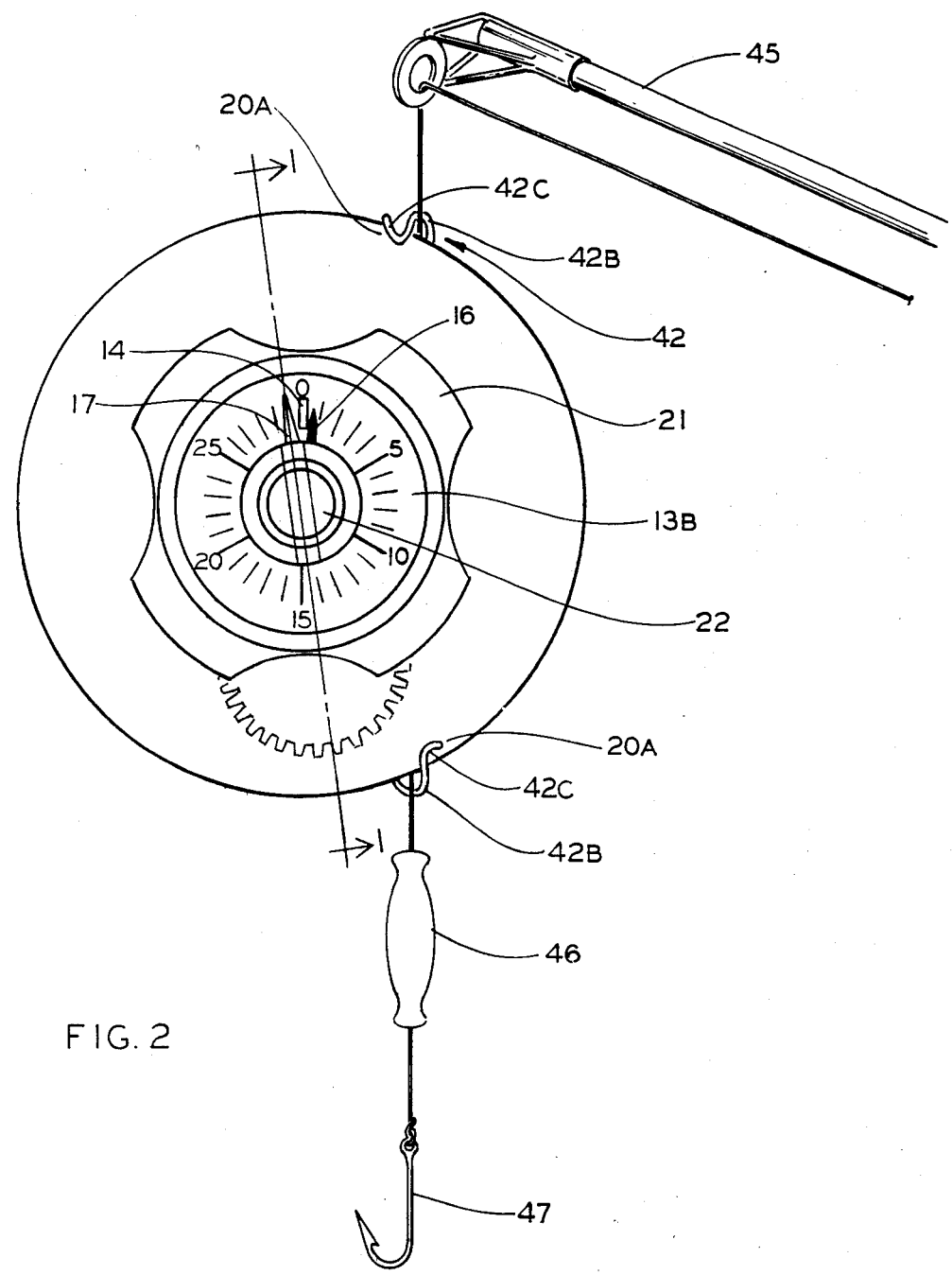
FIG. 2 is an elevational view of a line-measuring fishing bobber according to the present invention illustrating particularly the placement of the index and stop relative to the detent preparatory to casting the bobber and measuring the depth of the water.

The present bobber is operated in the following manner. As indicated in FIG. 2, the bobber is positioned on the fishing line 31 between the tip of a rod 45 and a sinker 46 that is secured to the line a short distance from a hook 47. The bobber is attached by wrapping the line 31 in a clockwise manner relative to the gauge face 13B two revolutions around the pulley 12. The opposing portions of the line extending from the pulley are then positioned in the line guides 42. The line is inserted into the guides by forcing the line between the outer surface of the dome rim 20A and the rounded, free end 42C of each guide until the line comes to rest within the loops 42B that are aligned with the opening between the pulley rims 27 and 28.

In order to determine the depth of the water in which one wishes to fish, the stop dial 21 and the index dial 22 are rotated manually so that the stop 17 and index 16 are positioned on opposite sides of the detent 14, the index being on the clockwise side and the stop being on the counter clockwise side of said detent. The bobber, sinker and hook are then cast as a group to the location where one wishes to fish.

Figure 3:
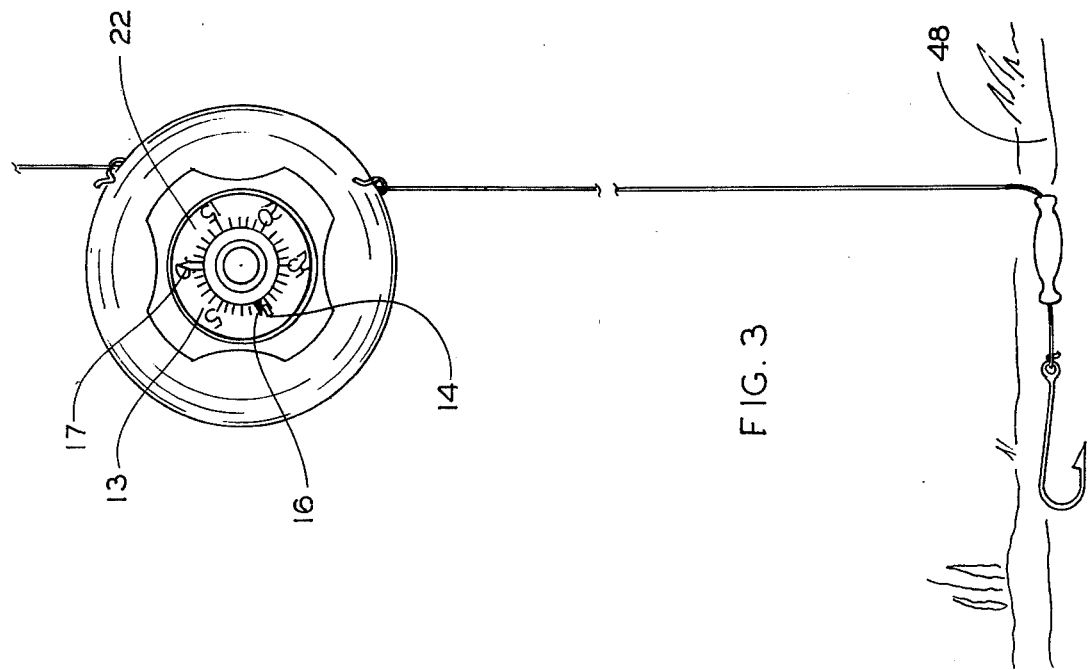
FIG. 3 is an elevational view similar to FIG. 2 illustrating particularly the movement of the index and detent after casting the bobber into the water.

As indicated in FIG. 3, the present bobber floats once it lands, and the hook, line and sinker descend to the bottom 48 of the body of water. The movement of the line rotates the pulley in clockwise fashion. Likewise, the gauge 13 and detent 14 will, as previously indicated, rotate clockwise in reduced proportion to the rotation of the pulley. Since the index 16 is relatively freely rotatable on the index dial 22, the index will advance with the detent without creating sufficient resistance to the rotation of the detent to cause slippage between the outer pinion of the drive means and the base of the gauge.

The angler pauses for 15 to 30 seconds after the bobber hits the water to allow the sinker to reach the bottom and then reels in the line. Retraction of the line causes counter-clockwise rotation of the pulley and, in reduced proportions, the gauge and the detent. The stop 17 has, all along, retained its original position. Thus, when the detent meets the stop, the bobber and line have returned to their original positions relative to one another prior to casting. The index, however, remains in the position it was guided to when the sink reached the bottom of the body of water. The angler is thus able to read the depth directly according to the position of the index relative to the indicia-bearing face of the gauge.

Figure 4:
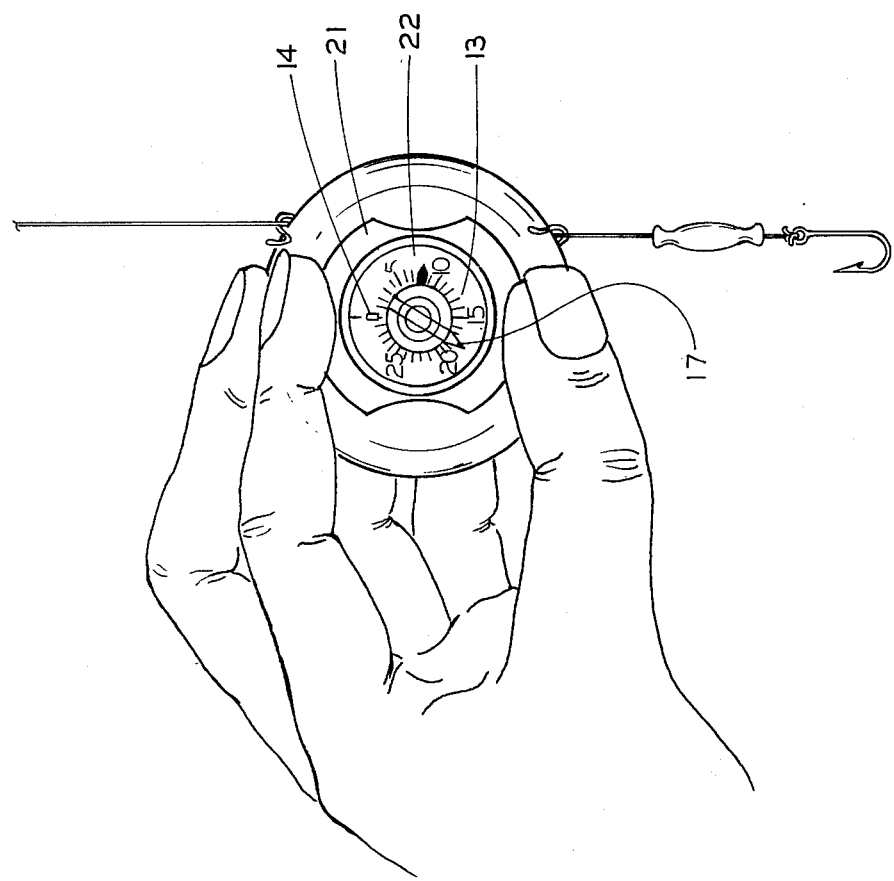
FIG. 4 is an elevational view similar to FIG. 2 illustrating particularly the manner in which the stop is positioned after retrieving the bobber.

In order to set the depth to which the hook will descend, the angler turns the stop dial counterclockwise, as indicated in FIG. 4, to a position determined by the depth reading, the amount of line between the hook and sinker and the distance off the bottom the angler wishes to place the hook. The counter-clockwise rotation of the stop dial 21 tends to move the index needle away from the depth reading but does not affect the position of the gauge 13, since the stop needle 17 lies on the counterclockwise side of the detent 14.

Figure 5:
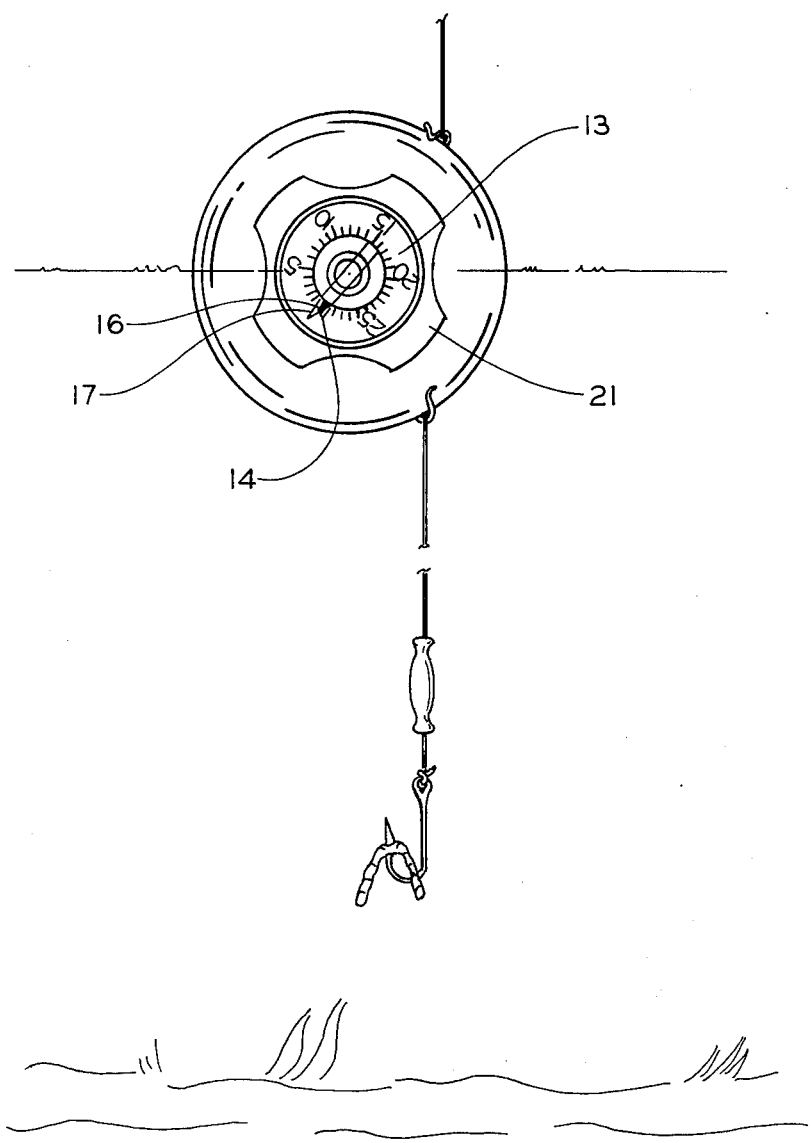
FIG. 5 is an elevational view similar to FIG. 2 illustrating particularly the movement of the detent relative to the stop after the bobber is recast into the water.

The angler then baits the hook and casts the bobber, sinker and hook into the area where the depth measurement was taken. As indicated in FIG. 5, the hook, line and sinker descend, thereby rotating the bobber gauge is clockwise fashion until the detent 14 engages the stop 17, at which point the baited hook will be at the desired depth.

If a fish happened to strike the hook or if it became snagged, a substantial amount of force would be exerted on the line to draw it outwardly. Damage to the drive mechanism is prevented because the slip connection 18 permits the pulley, shaft and gears to rotate while the gauge remains stationary. Thus, it may be seen that the present line-measuring fishing bobber not only permits the operator to draw the baited end of the line and the bobber close to the tip of the rod for effective casting, but also provides a means of determining the depth of the water in the area where the bait is to be cast, controls the depth at which the bait is suspended, and eliminates the possibility that a strong outwardly directed force on the line will destroy part of the drive mechanism inside the bobber.

While a single preferred embodiment of the present invention has been illustrated and described in some detail, this disclosure is not intended to restrict unduly the scope of the invention or the following claims.

I claim:

1. A line-measuring fishing bobber comprising:
   (a) a housing;
   (b) a rotative shaft extending into the housing;
   (c) a line-engaging pulley secured to the shaft externally to the housing;
   (d) an indicia-bearing gauge disposed within the housing and provided with a detent;
   (e) means disposed within the housing in communication with the shaft and the gauge for driving said gauge in reduced proportion to the movement of the pulley; and
   (f) a manually positionable index mounted on the housing and engagable with the detent for relatively nonimpeding movement therewith as the gauge is driven in one direction and disengagable as said gauge is driven in the opposite direction.

2. A line-measuring fishing bobber according to claim 1, which includes a manually positionable stop mounted on the housing and engagable with the detent to resist movement of the gauge.

3. A line-measuring fishing bobber according to claim 1, wherein the housing is watertight.

4. A line-measuring fishing bobber according to claim 1, which includes at least one line guide secured to the outer surface of the housing and provided with an aperture that is aligned with the pulley.

5. A line-measuring fishing bobber according to claim 1, wherein the means for driving the gauge includes a plurality of gear and pinion assemblies rotatively mounted on the shaft and a plurality of gear and pinion assemblies disposed in meshing relation with the gear and pinion assemblies on the shaft and rotatively mounted on a post that is axially offset from and parallel to said shaft.

6. A line-measuring fishing bobber comprising:
   (a) a housing;
   (b) a rotative shaft extending into the housing;
   (c) a line-engaging pulley secured to the shaft externally to the housing;
   (d) an indicia-bearing gauge disposed within the housing and provided with a detent;
   (e) a manually positionable stop mounted on the housing and engagable with the detent to limit movement of the gauge; and
   (f) means disposed within the housing in communication with the shaft and the gauge for driving said gauge in reduced proportion to the movement of the pulley, and including a slip connection that permits rotation of the shaft while the stop engages the detent on said gauge.

* * * * *